United States Patent [11] 3,607,023

[72] Inventor John A. Palm
 Jonesville, N.Y.
[21] Appl. No. 757,134
[22] Filed Sept. 3, 1968
[45] Patented Sept. 21, 1971
[73] Assignee General Electric Company

[54] PROCESS FOR PRODUCING COPPER OXIDE
 7 Claims, No Drawings
[52] U.S. Cl. .................................................. 23/147,
 75/72
[51] Int. Cl. .................................................. C01g 3/02,
 C22b 15/10
[50] Field of Search........................................... 23/147;
 75/72

[56] References Cited
 UNITED STATES PATENTS
3,172,753 3/1965 Walsh.............................. 75/72
3,186,833 6/1965 Cech............................... 75/72

Primary Examiner—Oscar R. Vertiz
Assistant Examiner—Hoke S. Miller
Attorneys—Charles T. Watts, Paul A. Frank, James M. Binkowski, Frank L. Neuhauser, Oscar B. Waddell and Melvin M. Goldenberg ABSTRACT: A process which comprises passing an aqueous solution of copper ammonium carbonate complex into a spray dryer to decompose the complex directly to copper oxide powder.

PROCESS FOR PRODUCING COPPER OXIDE

PROCESS FOR PRODUCING COPPER OXIDE

The present invention relates generally to the art of concentrating copper-containing materials such as copper ores and scrap for use in the production of metallic copper and is more particularly concerned with a novel method for decomposing a copper ammonium carbonate complex to produce copper oxide.

As the demand for copper has increased, ores containing as little as 1 percent copper have been mined, concentrated and the copper values extracted. Copper scrap has also become an important source of copper metal. Copper obtained from ore and scrap sources contains other metals alloyed with it which may need to be removed because they are valuable or because they render the copper unsuitable for the intended use. Since much of the copper produced for commercial use must not contain more than about 0.3 weight percent impurities, excluding silver, it is apparent that the concentration of ores and impurity removal constitutes a major part of copper processing and therefor, of total copper costs.

A number of processes employ cuprous or cupric oxide to produce pure copper or copper oxide. The production of cuprous oxide rather than cupric oxide may be preferred due to the ultimate recovery of more metallic copper per unit of input material to be reduced to elemental copper. Although these processes are operable with copper-containing materials such as ores and scrap, such operation is not economically feasible unless the copper-containing material is first concentrated since the cost of chemicals for commercially processing tonnages of ore having low copper content would be prohibitive.

U.S. Pat. No. 3,186,833 assigned to the present assignee discloses a leaching and decomposition process for obtaining high purity cuprous and/or cupric oxide for subsequent purifying reduction. This process comprises contacting the copper-containing material with an aqueous leaching solution composed of cupric ammonium carbonate complex and ammonia to extract the copper to form the cuprous ammonium carbonate complex, and then heating the resulting solution to decompose the cuprous ammonium carbonate complex, as well as any cupric ammonium carbonate complex which may be present to precipitate the corresponding cuprous or cupric oxides.

To carry out the decomposition of the complex, the solution can be heated to its boiling temperature externally but this kind of heating allows the cuprous and cupric oxides to plate out on the walls of the container or tower. Better results are obtained by heating the solution by injecting steam into it which permits the precipitating cuprous and cupric oxides to settle to the bottom of the tower. The precipitate is then recovered by filtration, washed with water, dried and the resulting filter cake is pulverized. The decomposition of the copper ammonium carbonate complex and the production of the dry copper oxide powder, therefore, requires a number of steps. In addition, an impractically long period of time is consumed in handling and transfer of materials alone.

In contrast to the foregoing method, the process of the present invention enables the decomposition of the complex and the production of the dry copper oxide powder to be carried out in a single step and in a much shorter time. Thus, according to the present process, the leaching solution is passed through a spray dryer where the copper ammonium carbonate complex is decomposed and the copper oxide produced directly in dry powder form.

The leaching solution is composed of an aqueous solution of cupric ammonium carbonate and ammonia, the constituents being present in the ionized forms:

(1) $Cu(NH_3)_4^{++}$; $(4+\gamma)(NH_3)aq.$; $2(HCO_3)^1$.

These ion formulas represent idealized conditions which in reality are probably much more complex.

The reaction between copper present in the copper-containing material and the leaching solution may be expressed as follows:

(2)
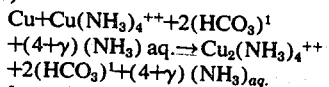
$+(4+\gamma)(NH_3)$ aq. $\rightarrow Cu_2(NH_3)_4^{++}$
$+2(HCO_3)^1+(4+\gamma)(NH_3)_{aq.}$

[$\gamma$=unknown excess quantity of dissolved ammonia].

Reaction 2 shows that the valence state of the copper in the copper amine complex is reduced from two to one and that the dissolved ammonia and the acid carbonate ion remain unchanged. Thus, the feature responsible for the dissolution of copper from the copper-containing material is the ability of the cupric amine complex to incorporate an additional copper, thereby changing the copper amine complex from cupric to cuprous form.

Typically, in carrying out the process, a small amount of cupric ammonium carbonate complex is added initially to the leach solution, and thereafter, additional quantities of the complex can be formed merely by adding ammonia ($NH_3$) and carbon dioxide ($CO_2$) to the solution before it is brought into contact with the source of copper. For optimum leaching capability, a ratio of $NH_3$ to $CO_2$ of from about 3–4to 1 can advantageously be used with a molar ratio of 3.4 to 1 being preferred. The leaching capacity of the copper ammonium carbonate solutions is directly proportional to reagent concentration so that the use of any particular concentration is primarily a matter of choice based on sound engineering and economic factors.

The leaching operation can be carried out in a leach tank by flowing the cupric ammonium carbonate complex leach solution through the copper-bearing material placed therein. The solution can be circulated repeatedly through the tank by means of connecting pipes and a pump to increase the cuprous ammonium carbonate complex content of the solution to the desired level. A quantity of the solution then may be withdrawn by a pump and filtered to remove solids which are carried in the fluid stream. The filtered solution is then passed to the spray dryer where it is atomized and heated to dissociate the copper amine complex to form the oxide.

The copper oxide powder is obtained by spray drying the product of reaction 2 as illustrated by reaction (3).

(3)
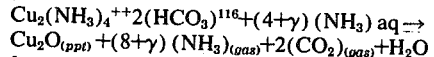
$Cu_2O_{(ppt)}+(8+\gamma)(NH_3)_{(gas)}+2(CO_2)_{(gas)}+H_2O$

[$\gamma$=unknown excess quantity of dissolved ammonia].

It will be recognized that cupric oxide is obtained as well as cuprous oxide since undoubtedly some cupric amine ions are present in the solution that is being heated. In addition, according to the present process, the ratio of cuprous to cupric oxides in the dry powder product may be varied by controlling the chemical composition of the spray dryer atmosphere. If air is used as the spray dryer atmosphere, the product will be comprised of essentially all cupric oxide. Cuprous oxide can be produced by the introduction of ammonia into the spray dryer atmosphere.

Conventional spray dryers may be used in the process of the present invention. For economy, the drying gas may be air thereby causing the copper oxide product to be comprised of essentially cupric oxide. By introducing and maintaining an ammonia concentration in the dryer atmosphere, cuprous oxide can be produced. Likewise, mixtures of cuprous and cupric oxides can be made at a balanced $NH_3$/air composition as the dryer atmosphere. The drying gas may flow cocurrent with or countercurrent to the spray. The atomization of the solution may vary from fine to coarse atomization and need only atomize the solution sufficiently at the temperature of the drying gas to enable the decomposition of the copper ammonium carbonate complex into dry copper oxide powder. For most applications, the temperature of the drying gases in the dryer, as measured by the outlet temperature of the fryer, may range from about 230° C. to about 350° c. Adjusting the spray dryer operation to provide the proper residence time of the powder in the dryer will achieve substantially complete conversion to copper oxide. In the short period of time generally required by commercially processes, temperatures lower than 230° C. do not decompose a sufficient amount of the copper complex to the corresponding oxide to be economically feasible. On the other hand, temperatures higher than about 350° C. do not provide any significant advantage. A temperature in the range of about 260° C. to 316° C. is preferred since it produces copper oxide in amounts close to the theoretical yield in the shortest residence time.

In the decomposition of the copper ammonium carbonate complex by the present process, carbon dioxide, ammonia and steam are byproducts. In manufacturing practice, conventional equipment such as condensers and scrubbers can be employed in conjunction with the spray dryer to recover these compounds.

The leaching of copper-containing material and decomposition of the resulting copper ammonium carbonate complex constitutes one embodiment of the present invention. In another embodiment, the solution of the copper ammonium carbonate complex, i.e. wherein the copper is cuprous, cupric or mixtures thereof, can be prepared in any manner and decomposed to the corresponding copper oxide by passing through the spray dryer as disclosed.

In the following examples, a vertical down-feed spray dryer about 40 inches in length and 36 inches in diameter was used. The solution was atomized by means of high-pressure nozzles to a coarse atomization wherein the droplets were about 200–500 microns in size. The drying gas was air and was passed cocurrent with the spray at a rate of approximately 300 cubic feet per minute.

The test solution of the copper ammonium carbonate complex was prepared by admixing 311 grams of ammonium carbonate $(NH_4)_2CO_3 \cdot H_2O$ with 279 grams of ammonium hydroxide $(NH_4OH)$ and a sufficient amount of water to bring the total volume up to 1 liter. To this solution was added a copper oxide powder which was a mixture of cuprous and cupric oxides until the copper concentration in solution was close to 90 grams per liter as determined by standard electrolytic analysis.

The dry powder product was likewise analyzed by standard electrolytic techniques.

EXAMPLE 1

With the outlet temperature of the spray dryer at 315° C., 300 cc. of the copper ammonium carbonate complex solution was passed through the dryer. The resulting dry powder product was black and analyzed 78.2 percent copper. The theoretical copper content of cupric oxide is 79.8 percent which indicates that the product formed was essentially all cupric oxide; with some contamination accounting for the slightly lower theoretical copper content.

The above procedure was repeated except that the spray dryer was operated at an outlet temperature of 205°C. The resulting dry powder product was a light green color which was apparently a copper carbonate product and not the desired copper oxide.

EXAMPLE 2

With the spray dryer operating at an outlet temperature of 260° C., 300 cc. of the copper ammonium carbonate solution was passed through the spray dryer. The dried powder as it came out of the dryer was a black powder which analyzed 73.6 percent copper.

EXAMPLE 3

With the spray dryer operating at an outlet temperature of 232°C., 300 cc. of the copper ammonium carbonate complex solution was passed through the spray dryer. The dried powder as it came out of the dryer was a mixture of green and black powders, which when thoroughly blended together analyzed 62.7 percent copper

What I claim as new and desire to secure by Letters Patent of the United States is:

1. A single step process for producing copper oxide powder from a copper ammonium carbonate complex which comprises passing an aqueous solution of copper ammonium carbonate complex through a spray dryer wherein in atomized form said solution is contacted with a drying gas having a temperature ranging from about 230° to 350° C to decompose said complex and form copper oxide powder, said drying gas being selected from the group consisting of air, ammonia and mixtures thereof.

2. A process according to claim 1 wherein said drying gas is a mixture of air and ammonia 3. A process according to claim 1 wherein the temperature of said drying gas is 315° C.

4. A process according to claim 1 wherein said aqueous solution of copper ammonium carbonate complex is formed by contacting a copper-containing material with an aqueous solution composed of cupric ammonium carbonate complex and ammonia to dissolve the copper therefrom.

5. A process according to claim 4 wherein the temperature of said drying gas is about 315° C.

6. A process according to claim 1 wherein said drying gas is air.

7. A process according to claim 1 wherein said drying gas is ammonia.